(12) United States Patent
Logan et al.

(10) Patent No.: US 9,984,582 B2
(45) Date of Patent: *May 29, 2018

(54) PEERED PROCTORING

(71) Applicant: Kryterion, Inc., Phoenix, AZ (US)

(72) Inventors: David Logan, Scottsdale, AZ (US);
Eric Walton, Queen Creek, AZ (US);
Michael Collins, Surprise, AZ (US)

(73) Assignee: Kryterion, Inc., Phoenix, AZ (US)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/194,081

(22) Filed: Jun. 27, 2016

(65) Prior Publication Data

US 2016/0307451 A1 Oct. 20, 2016

Related U.S. Application Data

(63) Continuation of application No. 14/807,798, filed on Jul. 23, 2015, now Pat. No. 9,378,648, which is a (Continued)

(51) Int. Cl.
*G06F 15/16* (2006.01)
*G09B 5/00* (2006.01)
(Continued)

(52) U.S. Cl.
CPC .......... *G09B 5/00* (2013.01); *G09B 7/00* (2013.01); *G09B 7/07* (2013.01);
(Continued)

(58) Field of Classification Search
CPC .... G09B 5/00; G09B 7/00; G09B 7/07; H04L 29/06176; H04L 43/50; H04L 65/60;
(Continued)

(56) References Cited

U.S. PATENT DOCUMENTS 4,458,315 A  7/1984 Uchenick
4,951,249 A  8/1990 McClung et al.
(Continued)

FOREIGN PATENT DOCUMENTS

CN  1949186  4/2007
CN  102696019 A  9/2012
(Continued)

OTHER PUBLICATIONS

David Arnow et al., "On-line Programming Examinations Using WebToTeach," ITiCSE '99 Jun. 1999, Cracow, Poland, pp. 21-24.
(Continued)

*Primary Examiner* — Moustafa M Meky
(74) *Attorney, Agent, or Firm* — Polsinelli LLP

(57) ABSTRACT

Systems and methods described herein utilize a distributed server network to allow for the real-time distribution of copies of a data stream uploaded from a computing device. The uploaded data stream corresponds to an environment surrounding a user (exam taker) of the computing device during execution of a testing routine for an examination. Providing copies of the data stream in real-time allows proctors as well as other test assessment authorities to 'peek in' on the exam taker's environment surrounding the exam. As a result, the environment surrounding the exam taker can be monitored in real-time to determine whether any visual or audio activity in the environment constitutes activity not in accordance with the exam protocol. Following an affirmative determination that the exam taker violated an exam taking protocol, the proctor or other test assessment authority can then make a final or early decision regarding disciplinary action.

14 Claims, 7 Drawing Sheets

Related U.S. Application Data continuation of application No. 14/179,410, filed on Feb. 12, 2014, now Pat. No. 9,092,991, which is a continuation of application No. 12/913,694, filed on Oct. 27, 2010, now Pat. No. 8,713,130, which is a continuation-in-part of application No. 12/850,136, filed on Aug. 4, 2010, now Pat. No. 9,137,163.

(51) Int. Cl.

| | | |
|---|---|---|
| *H04L 29/06* | (2006.01) | |
| *G09B 7/00* | (2006.01) | |
| *G09B 7/07* | (2006.01) | |
| *H04L 12/26* | (2006.01) | |
| *H04L 29/08* | (2006.01) | |
| *G08B 13/196* | (2006.01) | |

(52) U.S. Cl.
CPC ........ *H04L 29/06176* (2013.01); *H04L 43/50* (2013.01); *H04L 65/60* (2013.01); *H04L 65/601* (2013.01); *H04L 67/104* (2013.01); *G08B 13/19656* (2013.01); *G08B 13/19663* (2013.01)

(58) Field of Classification Search
CPC ................ H04L 65/601; H04L 67/104; G08B 13/19656; G08B 13/19663
See application file for complete search history.

(56) References Cited

U.S. PATENT DOCUMENTS

| | | | |
|---|---|---|---|
| 5,204,813 A | 4/1993 | Samph et al. | |
| 5,211,564 A | 5/1993 | Martinez et al. | |
| 5,361,359 A | 11/1994 | Tajalli et al. | |
| 5,412,717 A | 5/1995 | Fischer | |
| 5,635,940 A | 6/1997 | Hickman et al. | |
| 5,743,743 A | 4/1998 | Ho et al. | |
| 5,809,230 A | 9/1998 | Pereira | |
| 5,815,252 A | 9/1998 | Price-Francis | |
| 5,867,646 A | 2/1999 | Benson et al. | |
| 5,915,973 A | 6/1999 | Hoehn-Sarci et al. | |
| 5,919,257 A | 7/1999 | Trostle | |
| 5,987,611 A | 11/1999 | Freund | |
| 6,021,438 A | 2/2000 | Duvvoori et al. | |
| 6,112,049 A | 8/2000 | Sonnenfield | |
| 6,185,619 B1 | 2/2001 | Joffe et al. | |
| 6,266,773 B1 | 7/2001 | Kisor et al. | |
| 6,281,894 B1 | 8/2001 | Rive | |
| 6,282,404 B1 | 8/2001 | Linton | |
| 6,282,573 B1 | 8/2001 | Darago et al. | |
| 6,338,149 B1 | 1/2002 | Ciccone, Jr. et al. | |
| 6,418,298 B1 | 7/2002 | Sonnenfield | |
| 6,427,063 B1 | 7/2002 | Cook et al. | |
| 6,453,398 B1 | 9/2002 | McKenzie | |
| 6,523,119 B2 | 2/2003 | Pavlin et al. | |
| 6,694,434 B1 | 2/2004 | McGee et al. | |
| 6,766,458 B1 | 7/2004 | Harris | |
| 6,948,153 B2 | 9/2005 | Bowers | |
| 6,954,456 B2 | 10/2005 | Cranor et al. | |
| 6,966,048 B2 | 11/2005 | Bowers | |
| 6,978,115 B2 | 12/2005 | Whitehurst | |
| 7,069,586 B1 | 6/2006 | Winneg et al. | |
| 7,080,303 B2 | 7/2006 | Bowers | |
| 7,165,269 B2 | 1/2007 | Winneg et al. | |
| 7,194,664 B1 | 3/2007 | Fung | |
| 7,293,281 B1 | 11/2007 | Moran et al. | |
| 7,318,727 B2 | 1/2008 | Bowers | |
| 7,494,340 B2 | 2/2009 | Bowers et al. | |
| 7,725,737 B2 | 5/2010 | Konanka et al. | |
| 7,886,029 B2 | 2/2011 | Rogers et al. | |
| 8,489,635 B1 | 7/2013 | Phoha et al. | |
| 8,713,130 B2 * | 4/2014 | Logan .................... | G09B 7/00 434/362 |
| 9,092,991 B2 | 7/2015 | Logan | |
| 9,137,163 B2 | 9/2015 | Perryman | |
| 9,141,513 B2 | 9/2015 | Foster | |
| 9,280,907 B2 | 3/2016 | Dorman | |
| 9,378,648 B2 | 6/2016 | Logan | |
| 9,430,951 B2 * | 8/2016 | Foster .................. | G06F 11/3664 |
| 9,716,748 B2 | 7/2017 | Perryman | |
| 2002/0056010 A1 | 5/2002 | Lincoln et al. | |
| 2002/0078139 A1 | 6/2002 | Dutta | |
| 2002/0111173 A1 | 8/2002 | Hendrey et al. | |
| 2002/0172931 A1 | 11/2002 | Greene et al. | |
| 2003/0140111 A1 | 7/2003 | Pace et al. | |
| 2003/0158928 A1 | 8/2003 | Knox et al. | |
| 2004/0010544 A1 | 1/2004 | Slater et al. | |
| 2004/0010720 A1 | 1/2004 | Singh et al. | |
| 2004/0080504 A1 | 4/2004 | Salesky et al. | |
| 2004/0172466 A1 | 9/2004 | Douglas et al. | |
| 2004/0229199 A1 | 11/2004 | Ashley et al. | |
| 2004/0230488 A1 | 11/2004 | Beenau et al. | |
| 2004/0236843 A1 | 11/2004 | Wing | |
| 2005/0086498 A1 | 4/2005 | Hulik | |
| 2005/0240935 A1 | 10/2005 | Ramanathan | |
| 2006/0080656 A1 | 4/2006 | Cain et al. | |
| 2006/0085528 A1 | 4/2006 | Thomas | |
| 2006/0174320 A1 | 8/2006 | Maru et al. | |
| 2006/0174338 A1 | 8/2006 | Winneg et al. | |
| 2007/0016777 A1 | 1/2007 | Henderson | |
| 2007/0048723 A1 * | 3/2007 | Brewer .................. | G09B 7/02 434/350 |
| 2007/0117082 A1 | 5/2007 | Winneg et al. | |
| 2007/0117083 A1 * | 5/2007 | Winneg .................. | G09B 7/00 434/350 |
| 2007/0162894 A1 | 7/2007 | Noller | |
| 2008/0049777 A1 | 2/2008 | Morrill et al. | |
| 2008/0133964 A1 | 6/2008 | Rogers | |
| 2009/0035740 A1 | 2/2009 | Reed et al. | |
| 2009/0196486 A1 | 8/2009 | Distante et al. | |
| 2009/0222552 A1 | 9/2009 | Chroscielewski et al. | |
| 2009/0222907 A1 | 9/2009 | Guichard | |
| 2010/0055659 A1 | 3/2010 | Rogers et al. | |
| 2010/0226532 A1 | 9/2010 | Hayasaka et al. | |
| 2011/0145392 A1 | 6/2011 | Dawson et al. | |
| 2011/0177484 A1 | 7/2011 | Morgan et al. | |
| 2011/0179491 A1 | 7/2011 | Spurlock et al. | |
| 2011/0207108 A1 | 8/2011 | Dorman | |
| 2011/0223576 A1 * | 9/2011 | Foster .................. | G09B 7/02 434/362 |
| 2011/0244440 A1 | 10/2011 | Saxon | |
| 2011/0279228 A1 | 11/2011 | Kumar | |
| 2012/0034584 A1 | 2/2012 | Logan | |
| 2012/0036215 A1 * | 2/2012 | Perryman ............. | H04L 47/125 709/217 |
| 2012/0077176 A1 | 3/2012 | Foster | |
| 2012/0077177 A1 | 3/2012 | Foster | |
| 2012/0135388 A1 * | 5/2012 | Foster .................. | G09B 7/02 434/362 |
| 2012/0162384 A1 | 6/2012 | Vesely et al. | |
| 2012/0176220 A1 | 7/2012 | Garcia | |
| 2012/0183181 A1 | 7/2012 | You | |
| 2013/0307766 A1 | 11/2013 | Amathnadu et al. | |
| 2014/0162228 A1 | 6/2014 | Logan | |
| 2014/0212865 A1 * | 7/2014 | Morgan .................. | G09B 7/00 434/350 |
| 2014/0272882 A1 | 9/2014 | Kaufman | |
| 2015/0077259 A1 * | 3/2015 | Kumar .................. | G09B 7/00 340/573.1 |
| 2015/0339935 A1 | 11/2015 | Logan | |
| 2016/0012743 A1 * | 1/2016 | Foster .................. | G06F 11/3664 434/362 |
| 2016/0112505 A1 | 4/2016 | Perryman | |
| 2016/0307455 A1 | 10/2016 | Dorman | |
| 2016/0335906 A1 * | 11/2016 | Foster .................. | G06F 11/3664 |
| 2017/0193833 A1 * | 7/2017 | Morgan .................. | G09B 5/125 |
| 2018/0048703 A1 | 2/2018 | Perryman | |

FOREIGN PATENT DOCUMENTS

| | | |
|---|---|---|
| EP | 2 483 781 | 8/2012 |
| EP | 2 630 582 | 8/2013 |

(56) References Cited

FOREIGN PATENT DOCUMENTS

| EP | 2 630 583 | 8/2013 |
|----|-----------|--------|
| WO | WO 99/36848 | 7/1999 |
| WO | WO 2011/041707 | 4/2011 |
| WO | WO 2011/115644 | 9/2011 |
| WO | WO 2012/018411 | 2/2012 |
| WO | WO 2012/018412 | 2/2012 |
| WO | WO 2014/159785 | 10/2014 |

OTHER PUBLICATIONS

Frank, Ariel J.; "Dependable distributed testing: Can the online proctor be reliably computerized?", E-Business (ICE-B), Proceedings of the 2010 International Conference on, IEEE, Jul. 26, 2010, pp. 1-10.
R. Sekar et al., "Synthesizing Fast Intrusion Prevention/Detection Systems From High-level Specifications," Proceedings of the 8th USENIX Security Symposium, Washington, D.C., Aug. 23-26, 1999, 17 pages.
PCT Application No. PCT/US2010/051169, International Search Report and Written Opinion dated Nov. 26, 2010.
PCT Application No. PCT/US2010/051811, International Search Report and Written Opinion dated Nov. 29, 2010.
PCT Application No. PCT/US2011/25533, International Search Report and Written Opinion dated Apr. 19, 2011.
PCT Application No. PCT/US2011/25545, International Search Report and Written Opinion dated Apr. 27, 2011.
PCT Application No. PCT/US2014/025131, International Search Report and Written Opinion dated Jul. 11, 2014.
Chinese Application No. 201080050561.2, Third Office Action dated Mar. 30, 2015.
Chinese Application No. 201080050561.2, Second Office Action dated Oct. 23, 2014.
Chinese Application No. 201080050561.2, Office Action dated Mar. 31, 2014.
European Application No. 10821352.1, Office Action dated May 30, 2012.
European Application No. 11814924.4 Extended European Search Report dated Feb. 1, 2016.
U.S. Appl. No. 12/571,666, Office Action dated Mar. 31, 2015.
U.S. Appl. No. 12/571,666, Final Office Action dated Feb. 28, 2014.
U.S. Appl. No. 12/571,666, Office Action dated Jan. 29, 2014.
U.S. Appl. No. 12/571,666, Final Office Action dated Oct. 23, 2012.
U.S. Appl. No. 12/571,666, Office Action dated Jun. 12, 2012.
U.S. Appl. No. 14/860,526, Office Action dated Dec. 30, 2015.
U.S. Appl. No. 12/850,136, Office Action dated Jan. 27, 2015.
U.S. Appl. No. 12/850,136, Final Office Action dated Oct. 31, 2013.
U.S. Appl. No. 12/850,136, Office Action dated Apr. 15, 2013.
U.S. Appl. No. 12/850,136, Final Office Action dated Sep. 12, 2012.
U.S. Appl. No. 12/850,136, Office Action dated Mar. 9, 2012.
U.S. Appl. No. 12/723,663, Office Action dated Sep. 15, 2015.
U.S. Appl. No. 12/723,663, Final Office Action dated Jan. 30, 2015.
U.S. Appl. No. 12/723,663, Office Action dated Oct. 7, 2014.
U.S. Appl. No. 12/723,663, Final Office Action dated Jun. 16, 2014.
U.S. Appl. No. 12/723,663, Office Action dated Dec. 18, 2013.
U.S. Appl. No. 12/723,663, Final Office Action dated Oct. 8, 2013.
U.S. Appl. No. 12/723,663, Office Action dated Jul. 17, 2013.
U.S. Appl. No. 12/723,663, Final Office Action dated Apr. 5, 2013.
U.S. Appl. No. 12/723,663, Office Action date Dec. 6, 2012.
U.S. Appl. No. 12/723,663, Final Office Action dated Aug. 16, 2012.
U.S. Appl. No. 12/723,663, Office Action dated Feb. 15, 2012.
U.S. Appl. No. 12/723,667, Final Office Action dated Oct. 23, 2015.
U.S. Appl. No. 12/723,667, Office Action dated Jan. 14, 2015.
U.S. Appl. No. 12/723,667, Office Action dated Jun. 2, 2014.
U.S. Appl. No. 12/723,667, Final Office Action dated Dec. 23, 2013.
U.S. Appl. No. 12/723,667, Office Action dated Oct. 3, 2013.
U.S. Appl. No. 12/723,667, Final Office Action dated Apr. 10, 2013.
U.S. Appl. No. 12/723,667, Office Action dated Dec. 6, 2012.
U.S. Appl. No. 12/723,667, Final Office Action dated Aug. 16, 2012.
U.S. Appl. No. 12/723,667, Office Action dated Feb. 15, 2012.
U.S. Appl. No. 12/723,666, Office Action dated Jun. 20, 2016.
U.S. Appl. No. 12/723,666, Final Office Action dated Apr. 9, 2015.
U.S. Appl. No. 12/723,666, Office Action dated Jul. 18, 2014.
U.S. Appl. No. 12/723,666, Final Office Action dated Dec. 18, 2013.
U.S. Appl. No. 12/723,666, Office Action dated Jun. 19, 2013.
U.S. Appl. No. 12/723,666, Final Office Action dated Apr. 5, 2013.
U.S. Appl. No. 12/723,666, Office Action dated Dec. 6, 2012.
U.S. Appl. No. 12/723,666, Final Office Action dated Aug. 1, 2012.
U.S. Appl. No. 12/723,666, Office Action dated Mar. 29, 2012.
U.S. Appl. No. 14/207,637, Final Office Action dated Mar. 21, 2016.
U.S. Appl. No. 14/207,637, Office Action dated Nov. 10, 2015.
U.S. Appl. No. 14/207,637, Final Office Action dated Oct. 17, 2014.
U.S. Appl. No. 14/207,637, Office Action dated Jun. 23, 2014.
U.S. Appl. No. 12/913,694, Final Office Action dated Aug. 29, 2013.
U.S. Appl. No. 12/913,694, Final Office Action dated May 7, 2013.
U.S. Appl. No. 12/913,694, Office Action dated Jan. 30, 2013.
U.S. Appl. No. 12/913,694, Office Action dated Dec. 7, 2012.
U.S. Appl. No. 14/179,410, Office Action dated Aug. 11, 2014.
U.S. Appl. No. 14/179,410, Final Office Action dated Nov. 21, 2014.
U.S. Appl. No. 12/913,697, Office Action dated May 4, 2015.
U.S. Appl. No. 12/913,697, Final Office Action dated Apr. 14, 2014.
U.S. Appl. No. 12/913,697, Office Action dated Jan. 3, 2014.
U.S. Appl. No. 12/899,085, Final Office Action dated May 19, 2016.
U.S. Appl. No. 12/899,085, Office Action dated Aug. 19, 2015.
U.S. Appl. No. 12/899,085, Final Office Action dated Jan. 26, 2015.
U.S. Appl. No. 12/899,085, Office Action dated Sep. 12, 2014.
U.S. Appl. No. 12/899,085, Final Office Action dated Mar. 5, 2013.
U.S. Appl. No. 12/899,085, Office Action dated Oct. 8, 2013.
U.S. Appl. No. 12/899,085, Office Action dated Jul. 31, 2012.
U.S. Appl. No. 14/855,216, Office Action dated Oct. 21, 2016.
U.S. Appl. No. 12/723,663, Office Action dated Oct. 20, 2016.
U.S. Appl. No. 12/723,667, Office Action dated Aug. 24, 2016.
U.S. Appl. No. 14/207,637, Final Office Action dated Aug. 30, 2016.
U.S. Appl. No. 12/899,085, Office Action dated Sep. 27, 2016.
U.S. Appl. No. 12/723,666, Office Action dated Aug. 10, 2017.
U.S. Appl. No. 15/064,570, Final Office Action dated Feb. 16, 2017.
Viola, Paul and Jones, Michael J.; "Rapid Object Detection using a Boosted Cascade of Simple Features, IEEE CVPR (2001)" (Viola et al.).
U.S. Appl. No. 14/207,637, Final Office Action dated Jan. 23, 2017.
U.S. Appl. No. 15/064,570, Office Action dated Nov. 2, 2016.
U.S. Appl. No. 14/207,637, Office Action dated Dec. 1, 2017.
U.S. Appl. No. 15/064,570, Office Action dated Nov. 1, 2017.
U.S. Appl. No. 15/218,448, David Foster, Maintaining a Secure Computing Device in a Test Taking Environment, filed Jul. 25, 2016.
U.S. Appl. No. 15/064,570, William Dorman, Proctored Performance Analysis, filed Mar. 8, 2016.
European Application No. 10821352.1 First Examination Report dated Aug. 24, 2017.
European Application No. 11814924.4 First Examination Report dated Oct. 5, 2017.
U.S. Appl. No. 15/659,368, Office Action dated Feb. 27, 2018.

\* cited by examiner

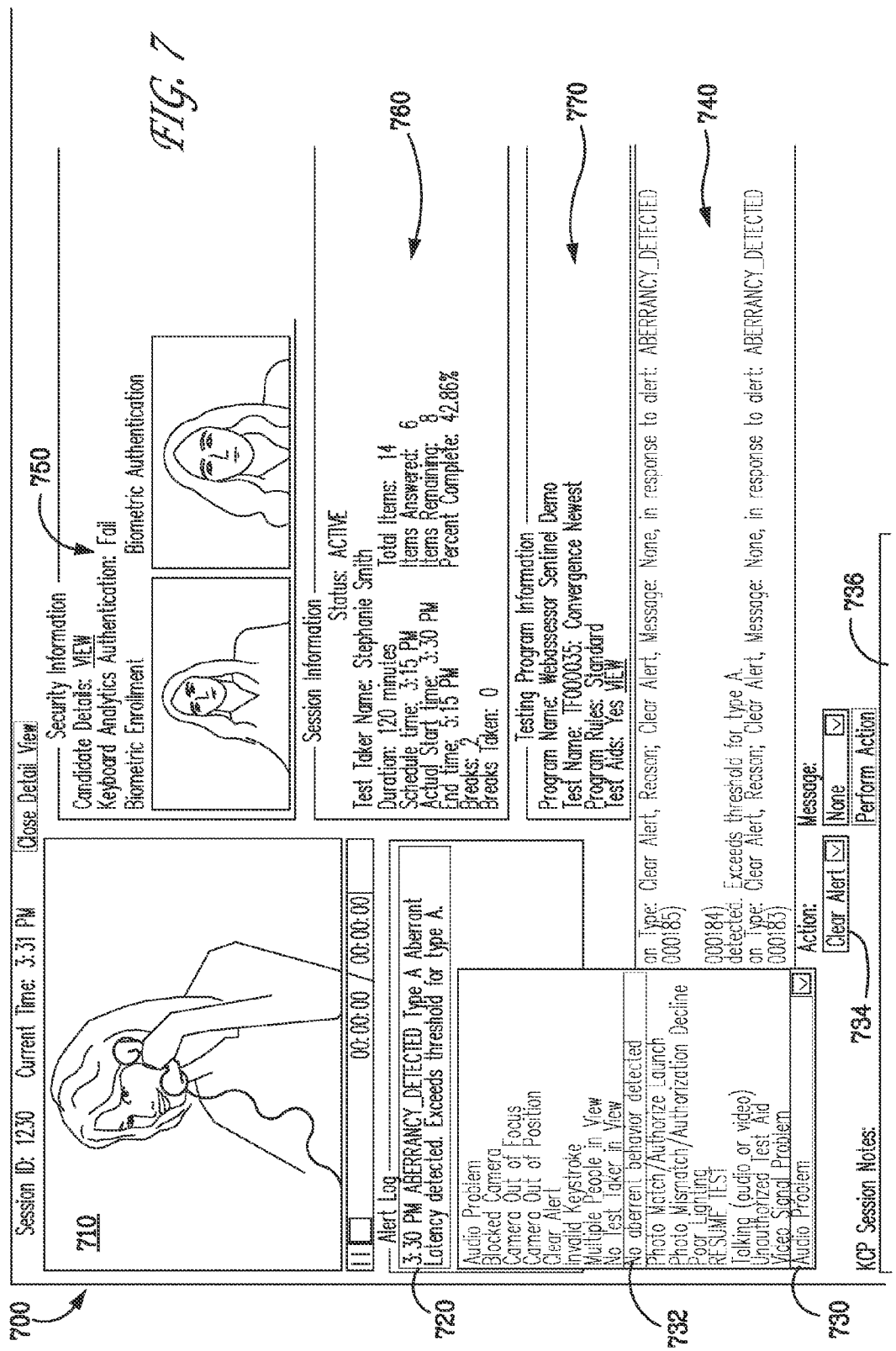

PEERED PROCTORING

CROSS-REFERENCE TO RELATED APPLICATIONS

The present application is a continuation and claims the priority benefit of U.S. patent application Ser. No. 14/807,798 filed on Jul. 23, 2015, and set to issue as U.S. Pat. No. 9,378,648 on Jun. 28, 2016, which is a continuation and claims the priority benefit of Ser. No. 14/179,410 filed Feb. 12, 2014, now U.S. Pat. No. 9,092,991 issued on Jul. 28, 2015, which is a continuation and claims the priority of benefit of U.S. patent application Ser. No. 12/913,694 filed Oct. 27, 2010, now U.S. Pat. No. 8,713,130 issued on Apr. 29, 2014, which is a continuation-in-part and claims the priority benefit of U.S. patent application Ser. No. 12/850,136 filed Aug. 4, 2010, now U.S. Pat. No. 9,137,163 issued on Sep. 15, 2015, the disclosures of all of which are incorporated herein by reference.

BACKGROUND OF THE INVENTION

Field of the Invention

The present invention generally relates to streaming multimedia data. More specifically, the present invention concerns managing the real-time distribution of a live data stream such as a live video data stream from a computing device.

Description of the Related Art

Examinations are used to determine the ability of an exam taker such as a student or prospective practitioner as it pertains to proficiency in a particular subject or skill set. For example, a student might take an exam to determine whether the student possesses requisite knowledge in a particular subject that might be related to receiving a degree or certificate. A prospective practitioner of law or medicine similarly might sit for an examination to determine their competence as it pertains to practicing in that profession. Students or prospective practitioners have historically gathered at the designated locale for an examination on a proscribed date and time. Examination materials are then handed out by a testing authority and the exam begins. During the allotted time, the exam takers read questions and provide answers on a provided answer sheet or in a 'blue book.' Throughout the course of examination, a teacher or proctor keeps careful watch over the exam takers to ensure that no instances of cheating are taking place. While a single proctor may be able to observe a small group of exam takers, such observation becomes more difficult for a larger exam taking pool or for a group of exam takers utilizing laptop computers or other computing devices.

The increased popularity of distance learning has also complicated proctoring of examinations. The distance learning instructional model delivers education material and information to students who are not physically 'on site' at an education facility. Distance learning provides access to learning opportunities when the source of the information and the student are separated by time or distance if not both. Thousands of distance learners may be involved in a particular distance learning program or course at any given time.

Distance learning is no different than any other educational program in that there is a need to verify the qualifications of students through examination. Because distance learners are not collectively gathered at a physical learning institution such as a university, the distance learning program often requires that the students attend an examination center—which defeats a purpose of distance learning—or administers an examination online. An online examination is difficult to proctor as an exam taker could be taking an examination in one window of a web browser while looking up answers in another window via the Internet. An exam taker could also utilize a 'chat' or 'messaging' application to relay questions to and receive answers from a knowledgeable third-party. The value of online examinations is, therefore, questionable and calls into question the overall value of the corresponding class or degree program.

Techniques for remotely monitoring the visual and/or audio environment surrounding the exam taker, through the use of an environment capture device such as a video camera or other capture device, are disclosed in commonly-owned U.S. patent application Ser. No. 12/723,666, the disclosure of which is incorporated herein by reference. In order to ensure the integrity of the exam process, the real-time audio and/or video data streams of the testing environment can be provided over a network to a remote proctor who is responsible for remotely observing the administration of the exam.

Uploading the data stream and subsequently providing it in real-time to a remote proctor is challenging for a number of reasons including high bit rates, delay, and loss sensitivity. In particular, the data stream is vulnerable to upload restrictions and/or disruptions along the 'first mile' from the test taker's computing device into the network, which can cause packet loss and delay of data in the data stream. This can be due to physical upload bandwidth limitations through the use of dial-up modems, or other upload restrictions such as network service provider limitations. As a result, the so-called 'first mile' can become a bottleneck, which can render further downstream techniques ineffective, since these downstream techniques cannot improve the bit rate and stream integrity of the initially uploaded data stream.

Similarly, the data stream is vulnerable to download restrictions and/or disruptions along the 'last mile' from the network to the remote proctor's computing device. As a result, the so-called 'last mile' can also become a bottleneck, which can render the previous upstream techniques for improving the bit rate and stream integrity ineffective. These download restrictions and disruptions also hamper the observation of the exam taker during the administration of the exam, which may call into question the integrity of the exam process.

There is a need in the art for managing the distribution of a data stream, which addresses first mile and last mile vulnerability issues. There is a similar need for improved remote proctoring of large scale examinations such that a small number of proctors can properly maintain the integrity of the testing environment, notwithstanding the large number of exam takers.

SUMMARY OF THE CLAIMED INVENTION

Embodiments of technologies for managing distribution of a data stream from a distributed computing device network are claimed.

In a first claimed embodiment, a computer-implemented method for managing distribution of a data stream from a distributed computing device network includes receiving a data stream into the distributed computing device network. The data stream corresponds to an environment surrounding a user of a first remote computing device during execution of a testing routine for an examination. The method includes receiving a request to transmit the data stream to a second remote computing device. The request identifies a geolocation of the second remote computing device and is received over the network during execution of the testing routine. A computing device of the distributed computing device network is selected to process the request by transmitting the data stream to the second remote computing device. The computing device is selected based on the geolocation of the second remote computing device. The method also includes transmitting the data stream from the selected computing device in the distributed computing device network to the second remote computing device in response to the request.

In a second claimed embodiment, a non-transitory computer-readable storage medium has a program embodied thereon. The program is executable by a processor of a computing device to perform a method for managing distribution of a data stream from a distributed computing device network. The method includes receiving a data stream into the distributed computing device network. The data stream corresponds to an environment surrounding a user of a first remote computing device during execution of a testing routine for an examination. The method includes receiving a request to transmit the data stream to a second remote computing device. The request identifies a geolocation of the second remote computing device and is received over the network during execution of the testing routine. A computing device of the distributed computing device network is selected to process the request by transmitting the data stream to the second remote computing device. The computing device is selected based on the geolocation of the second remote computing device. The method also includes transmitting the data stream from the selected computing device in the distributed computing device network to the second remote computing device in response to the request.

In a third claimed embodiment, a system for managing distribution of a data stream from a distributed computer network includes a plurality of computing devices forming a distributed computer network. Each of the plurality of computing devices includes a processor, memory, and a network interface. A selected computing device of the plurality of computing devices receives at the network interface a data stream into the distributed computing device network. The data stream corresponds to an environment surrounding a user of a first remote computing device during execution of a testing routine for an examination. The selected computing device also receives at the network interface a request to transmit the data stream to a second remote computing device. The request identifies a geolocation of the second remote computing device and is received over the network during execution of the testing routine. The selected computing device executes instructions stored in the memory. Upon executing the instructions, the selected computing device selects a computing device of the distributed computing device network to process the request by transmitting the data stream to the second remote computing device. The computing device is selected based on the geolocation of the second remote computing device. Upon executing the instructions, the selected computing device also transmits the data stream from the selected computing device in the distributed computing device network to the second remote computing device in response to the request.

BRIEF DESCRIPTION OF THE DRAWINGS

FIG. 7 illustrates a second interface that may be utilized in proctoring an online examination upon detecting aberrant behavior in the interface of FIG. 6.

DETAILED DESCRIPTION

Systems and methods described herein utilize a distributed server network to allow for the real-time distribution of copies of a data stream uploaded from a computing device. The uploaded data stream corresponds to an environment surrounding a user (exam taker) of the computing device during execution of a testing routine for an examination. A video camera device or other visual and/or audio environment capture device may be used to generate the data stream. This data stream is encoded and uploaded into the distributed server network. The distributed server network can then transmit copies of the data stream for playback on the computing device of a remote proctor, as well as other third party test assessment authorities (e.g., a professor), during the administration of the examination.

Providing copies of the data stream in real-time allows proctors as well as other third party test assessment authorities to 'peek in' on the exam taker's environment during the exam. As a result, the environment surrounding the exam taker can be monitored in real-time to determine whether any visual or audio activity in the environment constitutes activity not in accordance with the exam protocol. Following an affirmative determination that the exam taker violated an exam taking protocol, the proctor or other third party test assessment authority can then make a final or early decision regarding disciplinary action.

The management of the distribution of the copies utilizing the distributed server network also allows for the real-time sharing and shifting of proctoring responsibilities, as well as those of the third party test assessment authorities. Advantageously, this provides for remote proctoring of large scale examinations such that a small number of proctors and third party authorities can properly maintain the integrity of the testing environment, notwithstanding the large number of exam takers.

Figure 1:
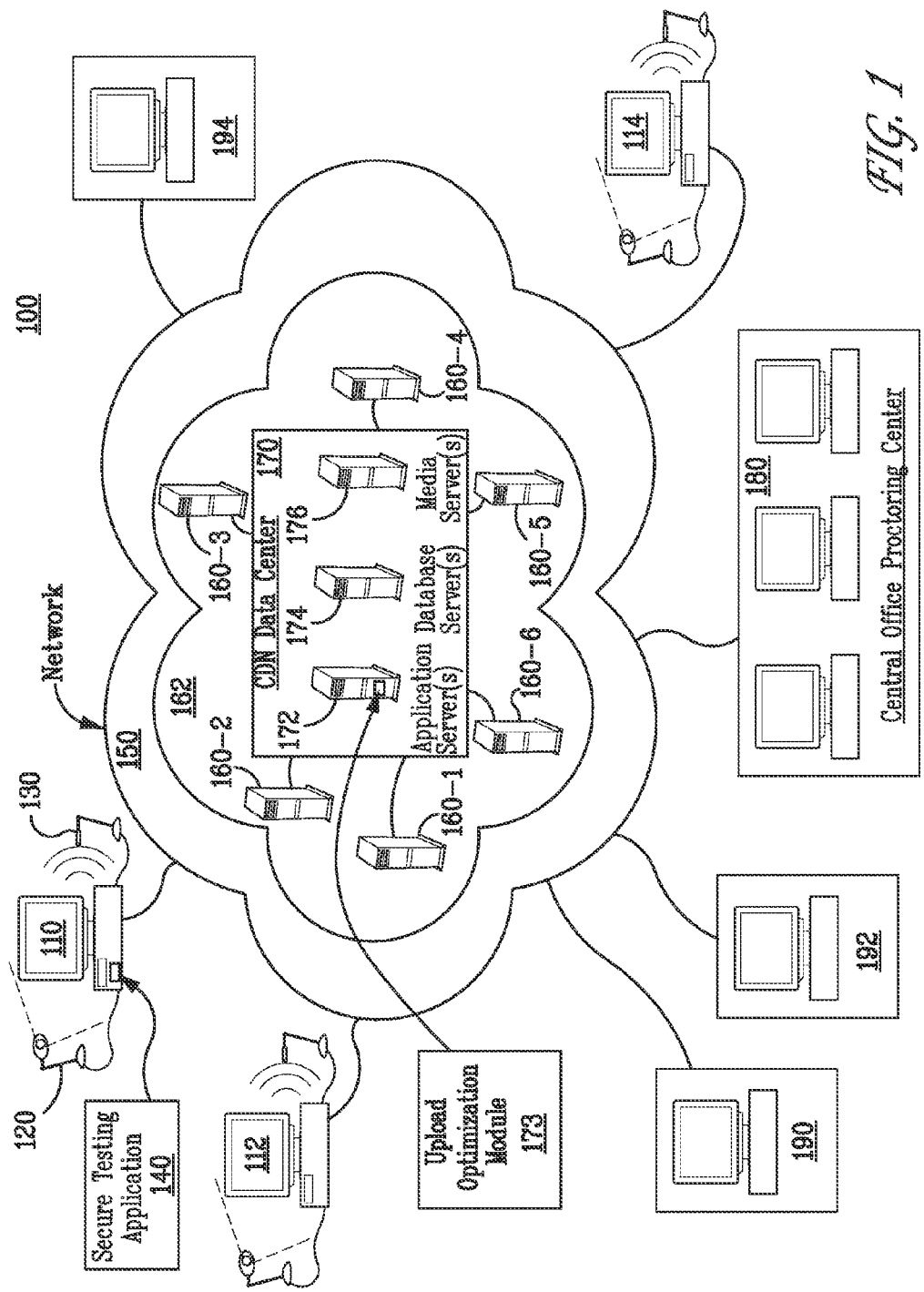
FIG. 1 illustrates a system for providing optimization of entry and subsequent real-time distribution of a data stream uploaded into a distributed server network.

FIG. 1 illustrates a system 100 for providing optimization of entry and subsequent real-time distribution of a data stream uploaded into a distributed server network such as a content delivery network (CDN) 162. The system 100 of FIG. 1 includes computing devices 110, 112, 114 that may be utilized by a user (exam taker) to take an examination, CDN 162 for administering an examination and for routing exam data including real-time data streams via a communications network 150, a central office proctoring center 180, and geographically distributed proctoring centers 190, 192, 194. The computing devices 110, 112, 114 may be any sort of computing device as is known in the art. The computing devices 110, 112, 114 include memory for storage of data and software applications, a processor for accessing data and executing applications, and input and output devices that allow for user interaction. The computing devices 110, 112, 114 further include components that facilitate communication over the communications network 150 such as an RJ-45 connection for use in twisted pair based 10baseT networks or a wireless network interface card allowing for connection to a radio-based communication network (e.g., an 802.11 wireless network).

The computing devices 110, 112, 114 may each be a general purpose computing device such as a desktop or laptop computer. The computing devices 110, 112, 114 may belong to a particular user rather than being a computing device dedicated to exam taking as might be found in an examination center. Thin client or netbook client devices may be implemented in the context of computing devices 110, 112, 114 as might mobile computing devices such as smart phones.

Communication network 150 may be a local, proprietary network (e.g., an intranet) and/or may be a part of a larger wide-area network. The communication network 150 may be a local area network (LAN), which may be communicatively coupled to a wide area network (WAN) such as the Internet. The Internet is a broad network of interconnected computers and servers allowing for the transmission and exchange of Internet Protocol (IP) data between users connected through a network service provider. Examples of network service providers are the public switched telephone network, a cable service provider, a provider of digital subscriber line (DSL) services, or a satellite service provider. Communication network 150 allows for communication between the various components of system 100.

The computing device 110 is representative of the computing devices 110, 112, 114. As described below, a video camera device 120 or other visual and/or audio environment capture device is used to monitor the exam taking environment surrounding the user (exam taker) of the computing device 110 during administration of an examination. The video camera device 120 generates a real-time data stream of the exam taking environment. This data stream is encoded and uploaded by the computing device 110 into the CDN 162, which in turn transmits the data stream in real-time to the central office proctoring center 180, and/or one or more geographically distributed proctoring centers 190, 192, 194.

A proctor or other third party assessment authority may then view the data stream via a streaming technique in real-time (i.e., during administration of the examination) utilizing a viewing application (e.g., view application 196), and determine if any visual activity in the examination environment constitutes activity not in accordance with the exam protocol. The term "streaming" as used herein refers to the transmission of data in the data stream by the CDN 162 to the computing device of an end user such as proctor, without requiring that the data stream first be uploaded in its entirety to the CDN 162.

The CDN 162 is coupled to the communications network 150. The CDN includes a CDN data center 170 and a plurality of entry servers 160-1 to 160-6. In the system 100 illustrated in FIG. 1, six entry servers 160-1 to 160-6 are shown. Notwithstanding the six illustrated servers, the system 100 may include more of less entry servers.

The CDN data center 170 also manages the real-time upload and distribution of data streams of the examination environments from the computing devices 110, 112, 114, as well as the storing of the data streams for retrieval and playback in a non-streaming fashion. The CDN data center 170 includes an application server 172, database server 174, and media server 176. The application server 172, database server 174, and media server 176 are each a computing device and include memory, a processor for accessing data and executing applications, and components to facilitate communication over communications network 150. The application server 172 includes an upload/download optimization module 173 stored in memory and executed by a processor to invoke its corresponding functionality.

The optimization module 173 is executable to handle assignment requests from the computing devices 110, 112, 114 to upload data streams such as those captured by the environment capture devices during administration of an exam. These assignment requests are analyzed by the optimization module 173 to select one or more "optimum" entry servers in the plurality of entry servers 160-1 to 160-6. The "optimum" entry server or servers then serve as an entry point or points for the data stream into the CDN 162. The database server 174 stores entry server information such as data indicating the physical or network location of each of the entry servers 160-1 to 160-6. This information can then be used by the optimization module 173 to select the entry point or points for the data stream.

The optimization module 173 is also executable to handle requests to provide the data stream to the central office monitoring center 180, and distributed proctor monitoring centers 190, 192, 194. These requests are analyzed by the optimization module 173 to select one or more "optimum" entry servers in plurality of entry servers 160-1 to 160-6. The "optimum" entry server or servers then serve as the source or sources of the data stream out of the CDN 162.

The optimization module 173 in the illustrated embodiment includes a rate allocation algorithm and a network/location proximity algorithm. The rate allocation algorithm is used to determine the sending rate or upload bandwidth from each the computing devices 110, 112, 114 to assist in minimizing packet loss in the uploaded data streams. Similarly, the rate algorithm is used to determine the receiving rate or download bandwidth to each of the central office monitoring center 180 and distributed proctor monitoring centers 190, 192, 194 to assist in minimizing packet loss in the downloaded data streams.

The network/location proximity algorithm is used to determine the location of the computing devices 110, 112, 114 to assist in minimizing the probability of packets arriving late to the selected entry server. Similarly, the network/location proximity algorithm is used to determine the location of the distributed proctor monitoring centers 190, 192, 194 to assist in minimizing the probability of packets arriving there late. The optimization module 173 is described in further detail below with respect to FIGS. 3 to 5. The application server 172 also operates as an origin server for the exam content during the administration and proctoring of an examination. The exam content includes the uploaded data streams.

The exam content may also include exam data such as the actual exam (e.g. prompts and questions) or other data concerning an exam, as well and answers to the questions provided by the exam takers during an examination. Registration information of the exam takers, such as a name or examination identification number as well as a password, may also be stored in the database server 174. Other registration information might include a geographic location or address provided by the exam taker and proctor via a graphical user interface.

Biometric information such as a visual image of the exam taker may also be stored in the database server 174 and compared against a previously stored and known 'good' image of the exam taker. A similar comparison may be made with respect to a voice print. Retinal scans and finger prints, subject to the presence of the appropriate peripheral device, may also be stored and used for verifying exam taker identity. These peripheral devices may be implemented in the context of the use of video camera device 120, microphone 130, or other environment capture device.

The media server 176 handles the requests for the non-real-time playback of the uploaded data streams, which may be stored in the database server 174 as well as the entry servers 160-1 to 160-6.

The entry servers 160-1 to 160-6, in conjunction with the application server 172 and database server 174, provide high-performance upload and delivery of the exam content to the exam takers and the proctors.

Each of the entry servers 160-1 to 160-6 is a computing device which includes memory, a processor for accessing data and executing applications, and components to facilitate communication over communications network 150. The application server 172 handles the distribution of copies of the exam content to the entry servers 160-1 to 160-6. The exam content can then be stored and transmitted to the exam takers and proctors by way of the entry servers 160-1 to 160-6 using a variety of different load balancing techniques, instead of being transmitted directly by the application server 172. The distribution of the exam content to the entry servers 160-1 to 160-6 may include on-demand or push-based mechanisms that move the exam content from the database server 174 to the entry servers 160-1 to 160-6. In addition, the distribution of the uploaded data streams may consist of on-demand or push-based mechanisms that move the uploaded data streams between entry servers 160-1 to 160-6, without requiring that the uploaded data stream first enter the CDN data center 170.

The entry servers 160-1 to 160-6 are arranged at various physically remote locations or regions. For example, entry server 160-1 may be located in North America, entry server 160-2 may be located in Asia, and entry server 160-3 may be located in Europe. The entry servers 160-1 to 160-6 may be arranged at the "edge" of the communication network 150 so that the entry servers 160-1 to 160-6 can be located physically close to the exam takers and proctors. Due to this physical proximity, the entry servers 160-1 to 160-6 can provide faster, higher quality data transmissions to achieve better load balancing, lower latency, and higher throughput in delivering the data streams than may be otherwise achieved using solely the application server 172 Central office proctoring center 180 is an operations center with computing devices staffed with one or more proctors or other test assessment authorities observing the data streams of various examination environments for exam takers at one or more examination sites. These examination sites may be physically remote from the central office proctoring center 180. Examination sites can be examination centers dedicated to the offering of examinations, traditional classroom settings, as well as personal space such as a home or office workspace. The geographically distributed proctoring centers 190, 192, 194 include computing devices which may belong to a particular proctor or other test assessment authority, rather than being a computing device dedicated to proctoring as might otherwise be found in the central office proctoring center 180. The proctors and other test assessment authorities at the central office proctoring center 180 and geographically distributed proctoring centers 190, 192, 194 may observe and analyze a variety of different types of information to help ensure the integrity of the examination. The observation and analysis of information is described in further detail below with respect to secure testing application 140 and video camera device 120. The computing devices 110, 112, 114 are secured in order to prevent access to files or other types of data such as notes, outlines, and exam preparation material during an examination, as well as preventing access to applications that themselves allow for access to data. The computing devices 110, 112, 114 may be secured for the taking of an exam as described in commonly-owned U.S. patent application Ser. No. 12/571,666, the disclosure of which has been previously incorporated by reference.

The computing device 110, 112, 114 may be secured through the download and subsequent installation of a secure testing application (e.g., secure testing application 140 installed on computing device 110). Secure testing application 140 may be downloaded from application server 172 or another computing device coupled to communications network 150. Secure testing application 140 may also be installed from a computer-readable storage device such as a CD-ROM. The secure testing application 140 may then be stored in memory at the corresponding computing device 110 and executed by a processor to invoke its corresponding functionality.

Secure testing application 140 is a security application software that prevents computing device 110 from accessing certain data or applications that might otherwise be in violation of examination regulations or protocols as identified by application server 172. The security application software 140 causes the computing device 110 to operate in a secure mode by introducing certain changes to the system registry such that only those applications or files deemed necessary or appropriate by the exam administrator and as embodied in a corresponding exam protocol may be allocated address space, loaded into memory and ultimately executed by the computing device 110.

For example, an exam protocol for a particular examination may deny access to a web browser, e-mail client, and chat applications such that an exam taker may not electronically communicate with other individuals during the examination. This particular protocol may be downloaded to the computing devices 110 from the CDN 162 along with exam data. The secure testing application 140 then operates in accordance with the downloaded testing protocol such that certain applications are not allowed to be loaded and executed.

Similar prohibitions or permissions may apply to hardware components of the computing device 110 as well as any number of hardware peripherals that might be introduced to the computing devices 110. Examples of such peripherals that might be introduced include a second computer monitor, docking stations, a traditional full-sized keyboard as might be used with a laptop computer. Other peripherals might include thumb drives, 'time-shift' recording devices that offer TiVo®-like functionality, as well as any number of other plug-and-play peripherals.

The secure testing application 140 may also operate in conjunction with the CDN 162 to properly execute an exam routine for the given examination event. For example, the exam routine may allow for the user to have access to all questions at any given time such that the user may answer and not answer questions at their leisure and subsequently return to any questions at a later time for further review. The exam routine may alternatively require the exam taker to lock in an answer or set of answers and have the same reported to the CDN 162 prior to receiving a subsequent question.

The secure testing application 140 may also observe activity on the computing device 110 during administration of an examination. If an exam taker attempts to make changes to the system registry that were implemented by the secure testing application 140, the secure testing application 140 may identify and report these attempts to the central office monitoring center 180, and distributed proctor monitoring centers 190, 192, 194.

The secure testing application 140 operates in conjunction with video camera device 120 or other visual and/or audio capture device to monitor the exam environment surrounding the exam taker of the computing device 110. Video camera device 120, which may be a commercially available web camera or other image acquisition device, generates a real-time data stream of the exam environment. If the exam taker leaves their seat or another individual enters the exam area during the course of the examination, the video camera device 120 will capture this visual information. The video camera device 120 provides the data stream to the secure testing application 140. Other external devices may also be used to gather environment data that can be provided in the encoded data stream uploaded to the CDN 172, such as a microphone 130 or other environment capture device.

As described in more detail below, the secure testing application 140 encodes and uploads the captured data stream into the CDN 162. The CDN 162 in turn delivers the data stream to the central office monitoring center 180, and/or one or more geographically distributed proctor monitoring centers 190, 192, 194, during the administration of the examination.

The computing device 191 at the proctoring center 192 is representative of computing devices in the central office proctoring center 180 and geographically distributed proctoring centers 190, 192, 194. The computing device 191 may be any sort of computing device as is known in the art. The computing device 191 include memory for storage of data and software applications, a processor for accessing data and executing applications, and input and output devices that allow for user interaction. The computing device 191 further includes components that facilitate communication over the communications network 150.

The computing device 191 may be a general purpose computing device such as a desktop or laptop computer. Thin client or netbook client devices may be implemented in the context of computing device 191 as might mobile computing devices such as smart phones.

The computing device 191 includes a viewing application 196 stored in memory and executed by a processor to invoke its corresponding functionality. The viewing application 196 operates in conjunction with the CDN 162 to request, receive and display real-time data streams of the examination environment surrounding exam takers. The viewing application 196 is executable to request that the CDN 162 transmit data streams to the computing device 191, as well as to request that the CDN 162 transmit data streams to other proctor's computing devices.

The viewing application 196 may for example be a commercially available application such as a web browser, or any other software application which can be utilized for proctoring an online examination as described herein. The viewing application 196 may alternatively be created by the testing administrator or otherwise developed specifically for proctoring of the online exam.

Similar to the discussion above with regards to the secure testing application 140, in some embodiments the viewing application 196 may cause the computing device 191 to operate in a secure mode.

A proctor or other test assessment authority at the central office monitoring center 180 and/or the proctor monitoring centers 190, 192, 194 may then view the data stream provided by the CDN 162 and determine if any visual activity constitutes activity not in accordance with the exam protocol. The proctor may then log the information for further assessment by the actual exam administrator (e.g., the professor or professional association administrating the examination) or make a direct inquiry of the exam taker as to the nature of the observed behavior, provide a warning as to terminate that behavior, or otherwise intervene in the testing routine to resolve the aberrant behavior. The proctor or other test assessment authority viewing the data stream may also request that the CDN 162 temporarily or permanently transmit the data stream to another computing device, such as one or more of central office monitoring center 180 and the remote proctor monitoring centers 190, 192, 194. This allows for real-time sharing and shifting of responsibilities among the proctors and the third party test assessment authorities. As a result, a small number of proctors and assessment authorities can properly maintain the integrity of the testing environment, notwithstanding the large number of exam takers.

As an example, a proctor may be responsible for simultaneous observation of a number of data streams of the examination environments surrounding different exam takers. Upon detection of possible aberrant behavior by a particular exam taker, the proctor may request that the data streams of the other exam takers currently be received also be transmitted to the computing device of one or more proctors. In doing so, the proctor can more closely analyze the possible aberrant behavior by the particular exam taker, without allowing the remaining exam takers to go unobserved. This request may be generated automatically based on user input to the viewing application 196, such as the selection by the proctor that the data stream be 'exploded' into a larger view (like in FIG. 7).

As another example, a proctor may request that the data stream of a test taker exhibiting possible aberrant behavior be transmitted to the computing device of another proctor or third party test assessment authority (e.g., a professor) for the purpose of validating or making an affirmative determination that the exam taker in fact violated an exam taking protocol. Following a determination that an exam taker violated an exam taking protocol, the proctor or other third party test assessment authority can then make a final or early decision regarding disciplinary action.

Figure 2:
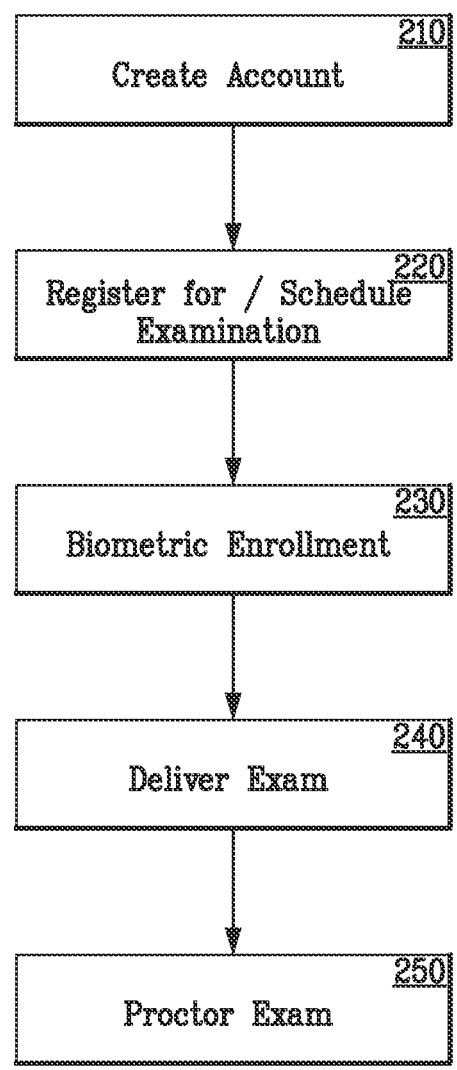
FIG. 2 illustrates a method for implementing an online proctored examination.

FIG. 2 illustrates a method for implementing an online proctored examination. In step 210, an account is created by an exam taker. In step 220, an exam taker registers for and/or schedules an examination. In step 230, an exam taker engages in biometric enrollment and authentication. In step 240 the exam is delivered and proctoring commences at step 250. The aforementioned steps may be carried out as described in co-pending U.S. patent application Ser. No. 12/723,667 entitled "Secure Online Testing," the disclosure of which is incorporated herein by reference.

Proctoring step 250 takes place over the course of the examination and may be implemented as part of step 240. The proctoring step 250 utilizes a variety of security technologies and processes to deter and detect aberrance during the exam process. In particular, the exam taking environment surrounding the exam taker is monitored in real-time by a proctor utilizing a live video feed of the exam taker. The live video feed is captured utilizing a video camera device or other visual and/or audio environment capture device, and uploaded and distributed in real-time by the CDN 162 utilizing the techniques described herein.

Figure 3:
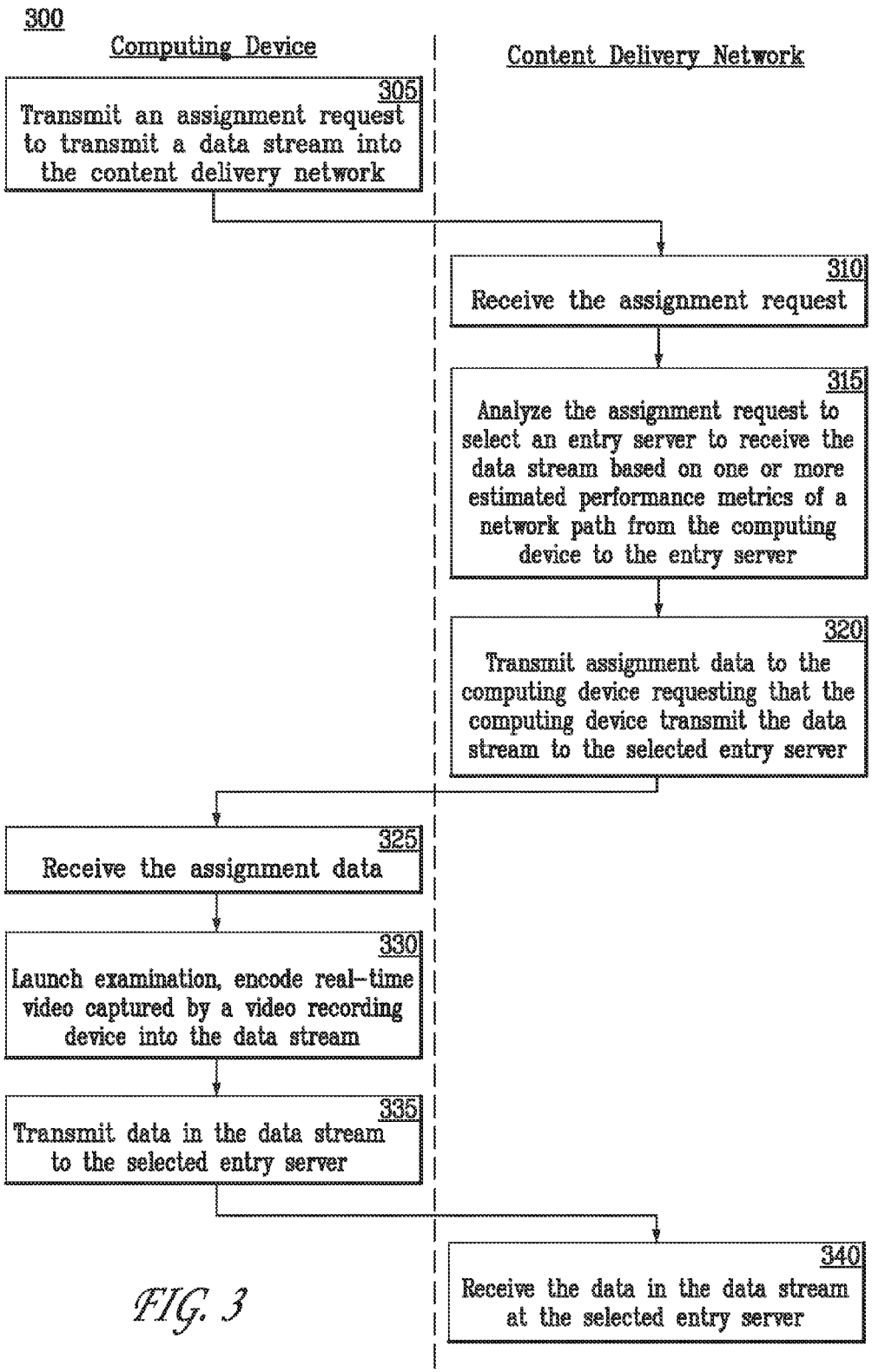
FIG. 3 illustrates a method for uploading a data stream of the examination environment surrounding the exam taker during an online proctored examination.

FIG. 3 illustrates a method 300 for uploading a data stream of the examination environment surrounding the exam taker during an online proctored examination. At step 305, the computing device 110 transmits an assignment request to the application server 172. The assignment request is a request for identification information of an entry server of the entry servers 160-1 to 160-6, which will serve as the entry point for the data stream into the CDN 162. The transmission of the assignment request may be initiated automatically by the secure testing application 140 upon successful completion of the enrollment and authentication of the exam taker. The assignment request will be described in more detail with respect to FIG. 4.

At step 310, the application server 172 receives the assignment request. At step 315 the assignment request is analyzed to select an entry server of the entry servers 160-1 to 160-6, which will be entry point for the data stream. This determination is made based on one or more estimated performance metrics for a network path from the computing device 110 to the selected entry server of the entry servers 160-1 to 160-6. The performance metrics can be computed using an estimated physical location of the computing device 110, as well as entry server information such as the physical location of each of the entry servers 160-1 to 160-6 stored in the database server 174. The analysis of the assignment request and the selection of the particular entry server in step 315 are described in further detail below with respect to FIG. 4.

At step 320, the application server 172 transmits assignment data to the computing device 110 requesting that the computing device 110 upload the data stream to the selected entry server. The assignment data may include data representing an IP address of the selected entry server, or other unique identifying information of the selected entry server which can be used to facilitate connection between the computing device 110 and the selected entry server.

At step 325, the computing device 110 receives the assignment data. At step 330, the secure testing application 140 launches the examination on the computing device 110. The secure testing application 140 may then provide the exam taker with instructions concerning the positioning of the video camera device 120 or other visual and/or audio environment capture device. Alternatively, this process may be undertaken at the enrollment and authentication stage.

The video camera device 120 operates in conjunction with the secure testing application 140 to generate a real-time data stream of the examination environment. This data stream is provided to secure testing application 140, which in turn encodes the data stream into an encoded data stream. The data stream is encoded in a format dependent upon the application, and in the illustrated embodiment is encoded as defined by the well-known H.264/AVC standard. The encoded data stream includes not only the image and audio data itself, but also the information to enable a decoder to decode the data stream, and information about the structure of the encoded data and the compression tools used during encoding. These streams may be referred to as "bitstreams," but the units of the encoded data stream in various embodiments can be bits, bytes, picture fields, frames, or any other unit that is appropriate for the embodiment.

Figure 4:
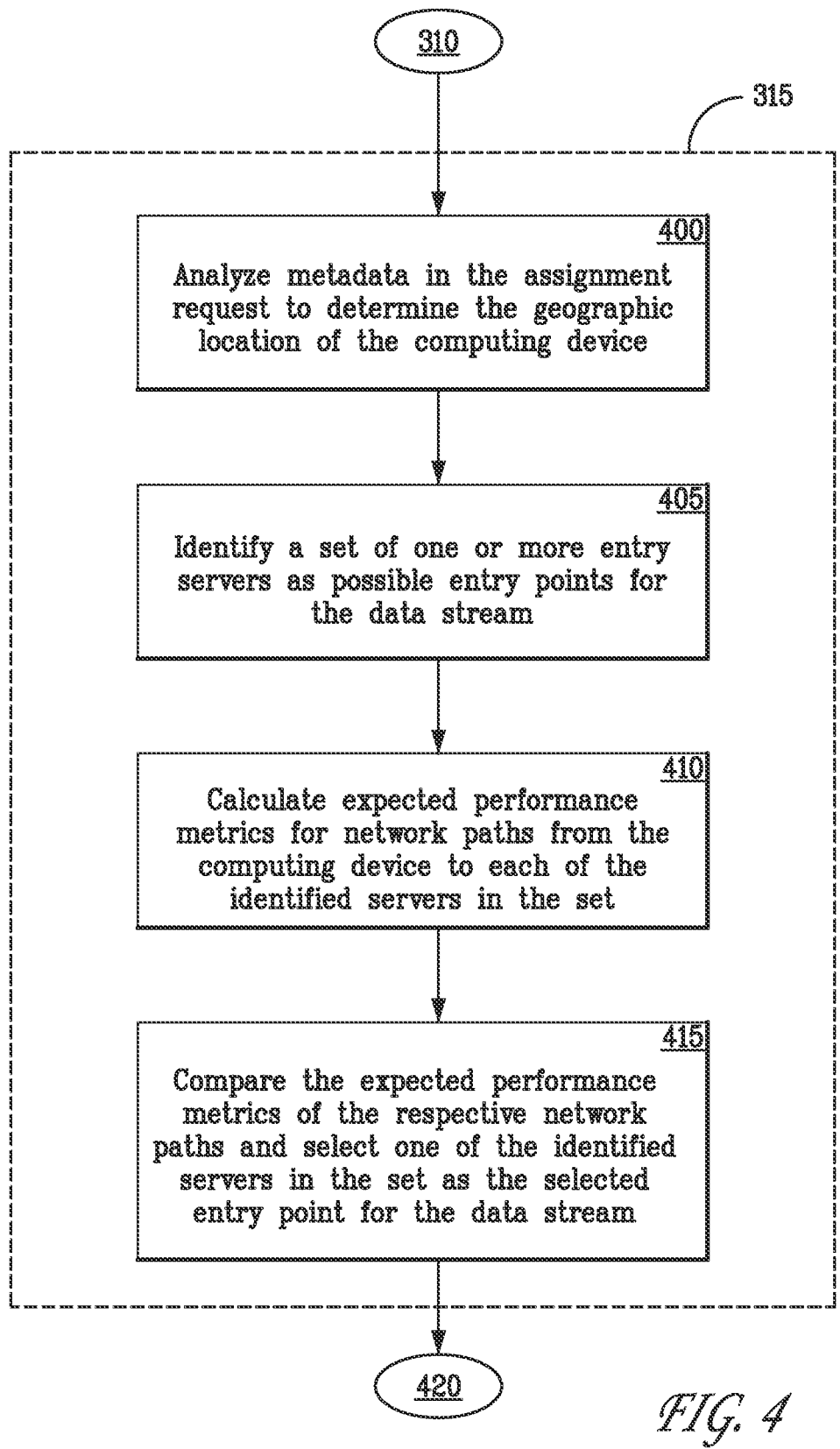
FIG. 4 is illustrates a method for selecting an entry server to receive an encoded data stream.

At step 335, the computing device 110 transmits the encoded data stream in real-time to the selected entry server using the assignment data received at step 325. The selected entry server acts as the entry point for the encoded data stream into the CDN 162, and receives the data in the encoded data stream at step 340. The CDN 162 can then in turn transmit copies of the encoded data stream in real-time to the central office proctoring center 180, and/or one or more geographically distributed proctoring centers 190, 192, 194, during the administration of the examination. A proctor may then view the data stream via a streaming technique, and determine if any visual activity in the examination environment constitutes activity not in accordance with the exam protocol. FIG. 4 is a method for selecting an entry server to receive the encoded data stream. At step 400, the assignment request is analyzed to determine the geographic location of the computing device 110. In the illustrated embodiment, the geographic location of the computing device 110 is determined by inspecting the IP address of the computing device 110 which is included in the assignment request. In alternative embodiments, other techniques for determining the geographic location of the computing device 110 may be used. For example, metadata in the assignment request may include the geographic location or address provided by the exam taker during registration or verification stages, or other metadata which can be used to identify the location of the computing device 110. In some embodiments, the geographic location or address of the computing device 110 may be determined utilizing the address information provided by the corresponding exam taker, which may for example be stored in the database server 174. As described above, this address information may be provided by the exam taker during the registration or verification stages. Alternatively, the exam taker may be prompted to provide such information prior to the launch of the examination.

At step 405, a set of one or more entry servers of the entry servers 160-1 to 160-6 are identified as possible entry points for the encoded data stream into the CDN 162. These identified entry servers may be a subset of the entry servers 160-1 to 160-6, which may be selected based on proximity to the determined geographic location of the computing device 110. For example, if it is determined that the computing device 110 is located in San Francisco, Calif., the set of entry servers may be those which are closest to San Francisco, Calif.

At step 410, expected performance metrics for different network paths from the computing device 110 to each of the identified entry servers are calculated. For example, if the set includes entry servers 160-1, 160-2 and 160-3, then the network paths from the computing device 110 through the network 150 to each of the entry servers 160-1, 160-2 and 160-3 are evaluated. These expected performance metrics may include bandwidth, packet loss, and delay for each of the various network paths. In some embodiments, these expected performance metrics are estimated without requiring an analysis of the actual performance metrics of the network paths. In such a case, relative values of the expected performance metrics may be determined by comparing the geographic location of the computing device 110 to the geographic and/or network locations of the identified entry servers. For example, the network path for the geographically closest entry server may be assigned the lowest estimated delay value. Alternatively, the actual performance metrics of the networks may be collected and analyzed.

At step 415, the performance metrics for the set of identified entry servers are compared to one another. The selected entry server to act as the entry point for the encoded data stream is then selected from the set based on this comparison. This selected entry server is selected as the "optimum" entry point into the CDN 162 for the encoded data stream, to allow for an optimal first mile experience for the data stream. The criteria for the selection of the "optimum" entry server can vary from embodiment to embodiment. The criteria may, for example, be performed by weighting each of the expected performance metrics for a given network path, and selecting the entry server based on comparison of the weighted results. The criteria may, for example, be based on minimizing delay and/or packet loss of the uploaded data stream into the CDN 162. Other and/or additional criteria such as upload bandwidth may also or alternatively be used.

The selection of the particular entry server may be based for example on which of the entry servers 160-1 to 160-6 is the closest to the computing device 110 in terms of network proximity. Network proximity may for example be represented by the delay or number of handoffs for the different network paths from the computing device 110 to each entry server of the set. In such a case, the selected entry server may correspond to the network path with the least number of handoffs.

The selection of the entry server may alternatively be based for example on which of the entry servers 160-1 to 160-6 is closest to the computing device 110 in terms of physical proximity. In such a case, the selected entry server may be the entry server which is geographically the closest to the computing device 110.

A backup entry server of the entry servers 160-1 to 160-6 may also be selected as an additional entry point for the data stream into the CDN 162. The backup entry server may be selected for example as the second most "optimum" entry point into the CDN 162, using the same criteria used to select the "optimum" entry point. In such a case, the assignment data transmitted to the computing device 110 by the application server 172 will further request that the computing device 110 also transmit the data stream to the selected backup entry server.

The utilization of the techniques for the optimization of the upload of a data stream as described herein provide for high data stream quality with low startup latency, as well as ensuring network friendliness and upload fairness. In addition, the techniques can be implemented within existing CDN infrastructures.

Figure 5:
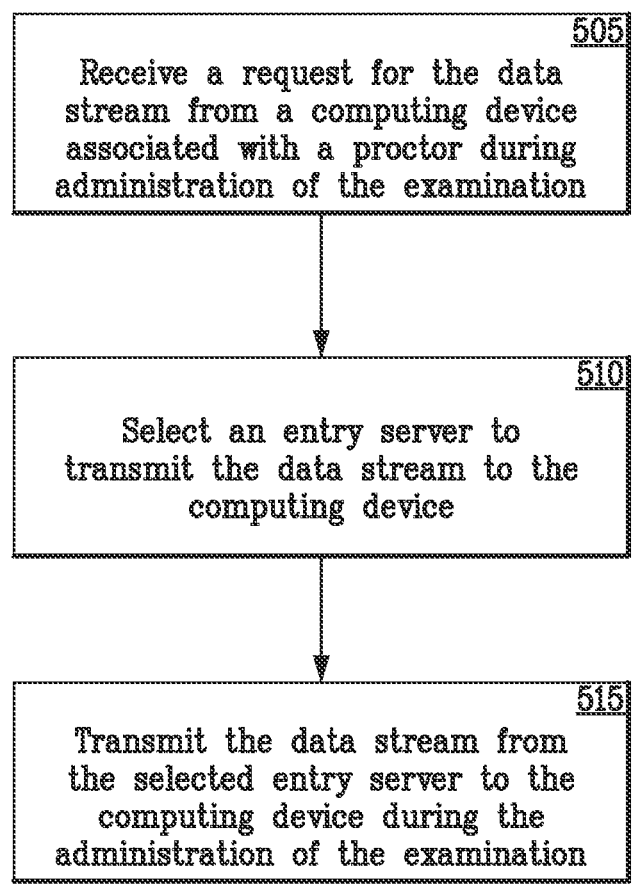
FIG. 5 illustrates a method for transmitting an uploaded data stream of an examination environment to a proctor or other third party assessment authority during an online proctored examination.

FIG. 5 illustrates a method 500 for transmitting an uploaded data stream of the examination environment to a proctor or other third party test assessment authority during an online proctored examination.

At step 505, the application server 172 receives a request to transmit a particular data stream to a computing device during the administration of the examination. In the illustrated example, the request for the data stream is from the computing device 191. As described above, alternatively the request may be a request that a data stream already being transmitted to the computing device 191 also be transmitted to a different computing device, so that proctoring responsibilities can be shared and/or shifted in real-time.

The request to transmit the data stream may for example be initiated based on user input provided to the viewing application 196 executing on the computing device 191. Alternatively, the request may for example be generated by the application server 172 on behalf of the computing device 191. For example, the request to begin transmitting the data stream to the computing device 191 may be automatically initiated by the application server 172 upon successful completion of the enrollment and authentication of the exam taker.

In response to the request, at step 510 the application server 172 selects an entry server in the entry servers 160-1 to 160-6 to transmit the data stream in a streaming fashion to the computing device 191. The application server 172 may select the entry server to transmit the data stream by analyzing the request in a manner similar to the techniques described above for selecting an "optimum" entry server which is the entry point for the data stream. For example, this determination can be made based on one or more estimated performance metrics for a network path from the selected entry server to the computing device 191. The performance metrics can be computed using an estimated physical location of the computing device 191, as well as entry server information such as the physical location of each of the entry servers 160-1 to 160-6 stored in the database server 174.

Various techniques may be used to determine the geographic location of the computing device 191. For example, the geographic location may be determined by inspecting the IP address of the computing device 191 which is included in the request. As another example, metadata in the request may include the geographic location or address provided by the proctor during login to begin a proctoring session, or other metadata which can be used to identify the location of the computing device 191. In some embodiments, the geographic location or address of the computing device 191 may be determined utilizing the address information provided by the proctor, which may for example be stored in the database server 174. Alternatively, the proctor may be prompted to provide such information prior to the beginning of a proctoring session. At step 515, the data stream is transmitted by the selected entry server of the CDN 172 to the computing device 191 associated with the proctor. The data stream can then be displayed by the viewing application 196, so that the proctor can monitor the examination environment surrounding the exam taker in real-time to detect possible aberrant behavior.

During the course of an examination, the proctor associated with the computing device 191 may be responsible for the simultaneous observation of a number of data streams of the examination environments surrounding different exam takers. Upon detection of possible aberrant behavior by a particular exam taker, the proctor may provide user input to the viewing application 196 requesting that the data streams of the other exam takers also be transmitted to the computing devices of one or more other proctors. The viewing application 196 transmits this request to the application server 172. The application server 172 then determines which computing devices are available to receive the data streams of the other exam takers, and selects one or more appropriate entry servers to transmit the data streams of the other exam takers. In doing so, the proctor can more closely analyze the possible aberrant behavior by the particular exam taker, without allowing the other exam takers to go unobserved. This selection of the entry servers to transmit the data streams of the other exam takers can be similar to the techniques described above for selecting an "optimum" entry server to transmit the data stream to the computing device 191.

The proctor may also request that the data stream of a test taker exhibiting possible aberrant behavior be transmitted to the computing device of another proctor or third party test assessment authority (e.g., a professor) for the purpose of validating or making an affirmative determination that the exam taker in fact violated an exam taking protocol. Following a determination that an exam taker violated an exam taking protocol, the proctor or other third party test assessment authority can then make a final or early decision regarding disciplinary action.

Upon detection of aberrant behavior by an exam taker, the proctor may intervene in the testing routine to resolve the aberrant behavior. The proctor may intervene by providing user input to the viewing application 196 which then transmits an indication to the application server 172 that aberrant behavior has been detected. In response to the indication, the application server 172 operates in conjunction with secure testing application 140 to resolve the aberrant behavior. For example, the application server 172 may transmit a request to the computing device 110 that the testing routine for the examination is no longer allowed to continue. Alternatively, the examination may be allowed to continue, but under a flag of caution requiring further analysis of the data stream during grading of the examination.

Figure 6:
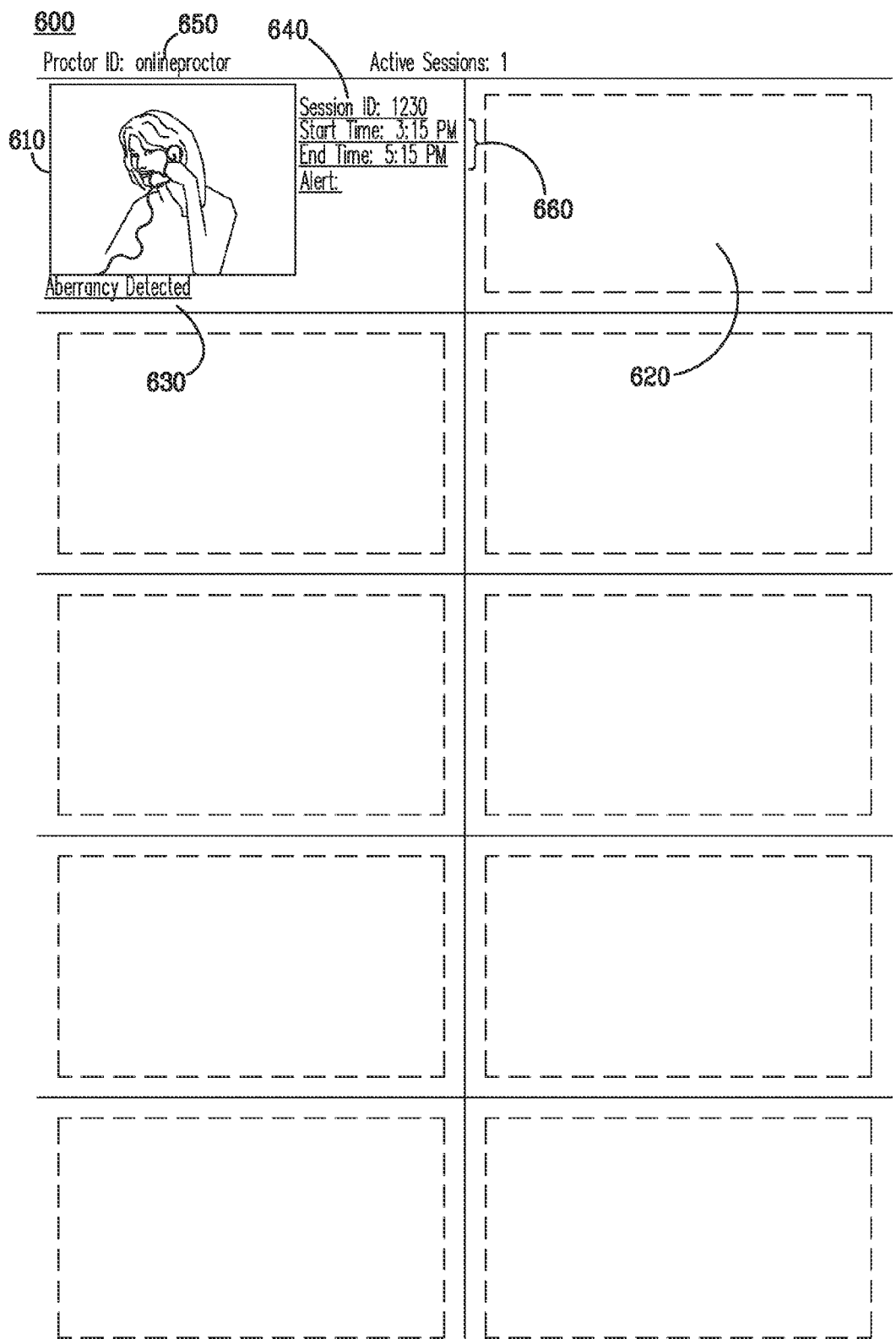
FIG. 6 illustrates a first interface that may be utilized in proctoring an online examination.

FIG. 6 illustrates an interface 600 that can be utilized in proctoring an online examination as might be observed on a computing device at the central office proctoring center 180 or the proctoring centers 190, 192, 194. Interface 600 may allow for simultaneous observation of a number of data streams of the examination environment surrounding different exam takers. As shown in FIG. 6, the data stream of a single examination environment 610 is being observed from a total of twelve available examination environments 620. As illustrated in FIG. 6, the examination environment 610 being monitored exhibits aberrant behavior as reflected by alert 630. Aberrant behavior may be automatically detected, or generated in response to proctor input. FIG. 6 also illustrates a session ID 640, which is unique to the exam taker; a proctor identification 650, which identifies a proctor responsible for observing the examination session; as well as a start and end time 660 for the examination session. All of this information may be utilized in generating assessment data or logs following completion of the examination. In some instances, aberrant behavior may result in the data stream of the examination environment being 'exploded' into a larger view (like in FIG. 7) in the case where the proctor is responsible for monitoring a large number of exam takers. Upon the exhibition of aberrant behavior as reflected by alert 630 in FIG. 6, the specific examination session may be singled out for further investigation through the interface 700 illustrated in FIG. 7.

FIG. 7 illustrates a second interface 700 that can be utilized in proctoring an online examination. The interface 700 may be launched in response to detecting aberrant behavior observed in the interface 600 of FIG. 6. The interface 700 of FIG. 7 (like that of interface 600 of FIG. 6) displays real-time video of the examination environment 610 of the exam taker. Recording of the video may take place upon detection of aberrant behavior for the purpose of validating or providing requisite evidence related to addressing disciplinary activity following an affirmative determination that an exam taker violated an exam taking protocol. In some instances the aberrant behavior may simply be that the examination environment needs to be modified to ensure proper proctoring, which could include raising the light level or decreasing background noise (e.g., closing a window). A proctor may provide this information to an exam taker. The interface 700 of FIG. 7 also illustrates a current alert log 720 that identifies the specific aberrant behavior that led to the automated alert 630 in the interface 600 of FIG. 6. The proctor may log the outcome of their determination related to the aberrant behavior in response log 730. Response log 730 allows a proctor to identify the particular behavior that was at issue (e.g., an audio problem or multiple people being present) (732) and the results of monitoring the aberrant behavior (734), which could include clearing the alert as a false alert, terminating the examination, or allowing the exam to continue. A proctor may also launch an on-demand verification of audio, visual, or keystroke analytics. Notes related to the incident may also be maintained in notes section 736 to further detail the specific incident. In some instances, the proctor may launch a live chat session with the exam taker while maintaining real-time observation. The interface 700 may also maintain additional information such as a historical alert log 740 that maintains a running list of all aberrant behavior for the exam taker in question as well as security information 750, session information 760, and testing program information 770. Security information 750 may display specific information about an exam taker, including biometric information such as a photograph. Session information 760 may display information such as the name of the exam taker, the number of exam items answered, the number of breaks taken, and so forth as illustrated in FIG. 7. Information concerning specific protocols related to the examination may be identified in exam program information window 770.

Logging of aberrant behavior may be tied to audio and video feeds of the examination environment. In such instances, a proctor may simply log the unusual behavior but leave it to the exam assessment authority as to the ultimate disciplinary behavior. Providing audio and video context tied to the alert may be useful in this regard.

Computer-readable storage media refer to any non-transitory storage medium and that may allow for instructions to be provided to a central processing unit (CPU) for execution. Such media can take many forms, including, but not limited to, non-volatile and volatile media such as optical or magnetic disks and dynamic memory, respectively. Common forms computer-readable media include, for example, a floppy disk, a flexible disk, a hard disk, magnetic tape, any other magnetic medium, a CD-ROM disk, digital video disk (DVD), any other optical medium, RAM, PROM, EPROM, a FLASHEPROM, and any other memory chip or cartridge.

Computer-readable storage medium, which are non-transitory in nature, differ from the various forms of transmission media may be involved in carrying one or more sequences of one or more instructions to a CPU for execution. A bus carries the data to system RAM, from which a CPU retrieves and executes the instructions. The instructions received by system RAM can optionally be stored on a fixed disk either before or after execution by a CPU. Various forms of storage may likewise be implemented as well as the necessary network interfaces and network topologies to implement the same. While various embodiments have been described above, it should be understood that they have been presented by way of example only, and not limitation. The descriptions are not intended to limit the scope of the invention to the particular forms set forth herein. To the contrary, the present descriptions are intended to cover such alternatives, modifications, and equivalents as may be included within the spirit and scope of the invention as defined by the appended claims.

What is claimed is:

1. A computer-implemented method for managing distribution of a data stream from a distributed computing device network, the method comprising:
 receiving a request for a data stream of an examination environment surrounding a user of a first remote computing device during execution of a testing routine, the request received over the distributed computing device network and during execution of the testing routine;
 identifying a computing device of the distributed computing device network to process the request based on at least one performance metric corresponding to a network path from the computing device to a second remote computing device; and
 transmitting the data stream from the identified computing device to the second remote computing device in response to the request.

2. The computer-implemented method of claim 1, further comprising:
receiving a second request to transmit the data stream to a third remote computing device included in the distributed computing device network, the second request received during execution of the testing routine; and
transmitting the data stream from the second remote computing device to the third remote computing device during execution of the testing routine in response to the second request.

3. The computer-implemented method of claim 1, wherein the at least one performance metric is at least one of a bandwidth metric, packet loss metric, and delay metric and wherein the at least one performance metric is determined based in part on a geographic location of the computing device and the second remote computing device.

4. The computer-implemented method of claim 1, wherein the at least one performance metric is at least one of a bandwidth metric, a packet loss metric, and delay metric and wherein the at least one performance metric is determined by analyzing data collected within the distributed computing device network that corresponds to the at least one performance metric.

5. The computer-implemented method of claim 1, wherein the data stream is a real-time video data stream of the examination environment surrounding the user of the first remote computing device during the testing routine.

6. The computer-implemented method of claim 1, further comprising receiving an indication from the second remote computing device that aberrant behavior in the examination environment has been detected through analysis of the data stream.

7. The computer-implemented method of claim 1, further comprising receiving the data stream into the distributed computing device network.

8. A non-transitory computer-readable storage medium having a program embodied thereon, the program being executable by a processor to perform a method for managing distribution of a data stream from a distributed computing device network, the method comprising:
receiving a request for a data stream of an examination environment surrounding a user of a first remote computing device during execution of a testing routine, the request received over the distributed computing device network and during execution of the testing routine;
identifying a computing device of the distributed computing device network to process the request based on at least one performance metric corresponding to a network path from the computing device to a second remote computing device; and
transmitting the data stream from the identified computing device to the second remote computing device in response to the request.

9. The non-transitory computer-readable storage medium of claim 8, further comprising:
receiving a second request to transmit the data stream to a third remote computing device included in the distributed computing device network, the second request received during execution of the testing routine; and
transmitting the data stream from the second remote computing device to the third remote computing device during execution of the testing routine in response to the second request.

10. The non-transitory computer-readable storage medium of claim 8, wherein the at least one performance metric is at least one of a bandwidth metric, packet loss metric, and delay metric and wherein the at least one performance metric is determined based in part on a geographic location of the computing device and the second remote computing device.

11. The non-transitory computer-readable storage medium of claim 8, wherein the at least one performance metric is at least one of a bandwidth metric, a packet loss metric, and delay metric and wherein the at least one performance metric is determined by analyzing data collected within the distributed computing device network that corresponds to the at least one performance metric.

12. The non-transitory computer-readable storage medium of claim 8, wherein the data stream is a real-time video data stream of the examination environment surrounding the user of the first remote computing device during the testing routine.

13. The non-transitory computer-readable storage medium of claim 8, further comprising receiving an indication from the second remote computing device that aberrant behavior in the examination environment has been detected through analysis of the data stream.

14. The non-transitory computer-readable storage medium of claim 8, further comprising receiving the data stream into the distributed computing device network.

* * * * *